(12) United States Patent
Mangaroo et al.

(10) Patent No.: US 7,787,239 B2
(45) Date of Patent: Aug. 31, 2010

(54) HOUSING FEATURE FOR PROVIDING STABILITY FOR A PORTABLE TERMINAL

(75) Inventors: Alan Mangaroo, Oakville (CA); Bo Xu, Mississauga (CA); Dinesh Gandhi, Brampton (CA)

(73) Assignee: Psion Teklogix Inc., Mississauga, Ontario ( * ) Notice: Subject to any disclaimer, the term of this patent is extended or adjusted under 35 U.S.C. 154(b) by 0 days.

(21) Appl. No.: 12/284,416

(22) Filed: Sep. 22, 2008

(65) Prior Publication Data

US 2010/0073869 A1 Mar. 25, 2010

(51) Int. Cl.
*G06F 1/16* (2006.01)

(52) U.S. Cl. .............................. 361/679.01; 235/462.45

(58) Field of Classification Search ............ 361/679.55, 361/679.56, 679.01; 235/462.45
See application file for complete search history.

(56) References Cited

U.S. PATENT DOCUMENTS

| | | | | |
|---|---|---|---|---|
| 4,953,113 A | * | 8/1990 | Chadima et al. | 361/679.3 |
| 5,241,488 A | * | 8/1993 | Chadima et al. | 235/1 D |
| 5,410,141 A | * | 4/1995 | Koenck et al. | 235/472.02 |
| 5,515,303 A | * | 5/1996 | Cargin et al. | 361/679.32 |
| 5,602,456 A | * | 2/1997 | Cargin et al. | 320/112 |
| 5,710,728 A | * | 1/1998 | Danielson et al. | 361/679.59 |
| 5,747,786 A | * | 5/1998 | Cargin et al. | 235/462.46 |
| 5,801,918 A | * | 9/1998 | Ahearn et al. | 361/679.55 |
| 6,421,234 B1 | * | 7/2002 | Ricks et al. | 361/679.56 |

* cited by examiner

*Primary Examiner*—Lisa Lea-Edmonds
(74) *Attorney, Agent, or Firm*—Ohlandt, Greeley, Ruggiero & Perle, L.L.P.

(57) ABSTRACT

A portable computing device including a housing having a top surface and a bottom surface connected to one another by a pair of sides, a proximal end and a distal end, the top surface including a user interface for operation by a user. The device comprises a planar surface located on the bottom surface at the proximal end, such that the planar surface extends to either side of a centerline of the housing and in a direction towards the distal end. The planar surface defines a plane and the centerline extends in a direction between the proximal end and the distal end. The device has at least one protrusion located on the bottom surface at the distal end, such that the at least one protrusion extends between the bottom surface and the plane, such that the at least one protrusion has a respective peripheral surface lying on the plane on both sides of the centerline. The at least one protrusion and the planar surface provide stability of the device when placed on a surface adjacent to the bottom surface, the stability facilitating operation of the user interface by the user.

11 Claims, 13 Drawing Sheets

HOUSING FEATURE FOR PROVIDING STABILITY FOR A PORTABLE TERMINAL

FIELD OF THE INVENTION

This invention relates to a housing for a portable terminal.

BACKGROUND

It is generally known to provide a contoured profile of a bottom surface for a portable device such as a portable scanner/reader for logistics environments. Such contoured profiles are typically moulded as integral to the housing of the device. The contoured profile of the housing helps to provide comfort to the user when holding the device during operation. Further, bottom surface projections of the housing can be present, in order to provide enclosures for various components of the portable device, such as for batteries, antennas, and other scanning/reading components that operate in a wireless fashion. Another typical reason for the contoured profile of the housing is for stylistic reasons to help differentiate the look of the device from other device products available in the marketplace.

A disadvantage of current portable terminals is that the contoured profile of the bottom surface may not provide a stable platform for the terminal when placed on an adjacent work surface, such as a table, by the device user. One desired mode of operation of the device by the user is to operate the user interface of the device while the device is positioned on the adjacent surface (e.g. table). Unfortunately, the same contours that provide for ease of holding for the device do not provide for stability of the device when operated on the adjacent surface. It is typical during operation of the user interface (e.g. pressing the touch screen and/or keys of the keypad) for the device to rock or otherwise wobble on the adjacent surface, thereby making operation of the user interface difficult for the user. One solution is for the user to hold the portable device steady on the adjacent surface with one hand while operating (e.g. pressing) the user interface with the other hand. However, the disadvantage of this mode of operation is that the user must use one of their hands to steady the device, thus providing for only one handed operation of the user interface.

Another disadvantage is that current devices, when placed on a work surface, do not facilitate stable operation of the user interface by one hand of the user while the other hand of the user is used to manipulate one or more objects (e.g. papers, writing implements, etc.) other than the device. Accordingly, it is recognised that operation of the contoured device can be awkward when placed on the adjacent work surface.

SUMMARY

It is an object of the present invention to provide a housing for a portable terminal to obviate or mitigate at least some of the above-presented disadvantages.

Current devices, when placed on a work surface, do not facilitate stable operation of the user interface by one hand of the user while the other hand of the user is used to manipulate one or more objects (e.g. papers, writing implements, etc.) other than the device. Accordingly, it is recognised that operation of the contoured device can be awkward when placed on the adjacent work surface. Contrary to current devices there is provided a portable computing device including a housing having a top surface and a bottom surface connected to one another by a pair of sides, a proximal end and a distal end, the top surface including a user interface for operation by a user. The device comprises a planar surface located on the bottom surface at the proximal end, such that the planar surface extends to either side of a centerline of the housing and in a direction towards the distal end. The planar surface defines a plane and the centerline extends in a direction between the proximal end and the distal end. The device has at least one protrusion located on the bottom surface at the distal end, such that the at least one protrusion extends between the bottom surface and the plane, such that the at least one protrusion has a respective peripheral surface lying on the plane on both sides of the centerline. The at least one protrusion and the planar surface provide stability of the device when placed on a surface adjacent to the bottom surface, the stability facilitating operation of the user interface by the user.

One aspect provided is a portable computing device including a housing having a top surface and a bottom surface connected to one another by a pair of sides, a proximal end and a distal end, the top surface including a user interface for operation by a user, the device comprising: a planar surface located on the bottom surface at the proximal end, the planar surface extending to either side of a centerline of the housing and in a direction towards the distal end, the planar surface defining a plane, the centerline extending in a direction between the proximal end and the distal end; at least one protrusion located on the bottom surface at the distal end, the at least one protrusion extending between the bottom surface and the plane, such that the at least one protrusion has a respective peripheral surface lying on the plane on both sides of the centerline; wherein the at least one protrusion and the planar surface provide stability of the device when placed on a surface adjacent to the bottom surface, the stability facilitating operation of the user interface by the user.

BRIEF DESCRIPTION OF THE DRAWINGS

Exemplary embodiments of the invention will now be described in conjunction with the following drawings, by way of example only, in which.

DETAILED DESCRIPTION OF THE PREFERRED EMBODIMENT(S)

Portable Terminal 10

Figure 1:
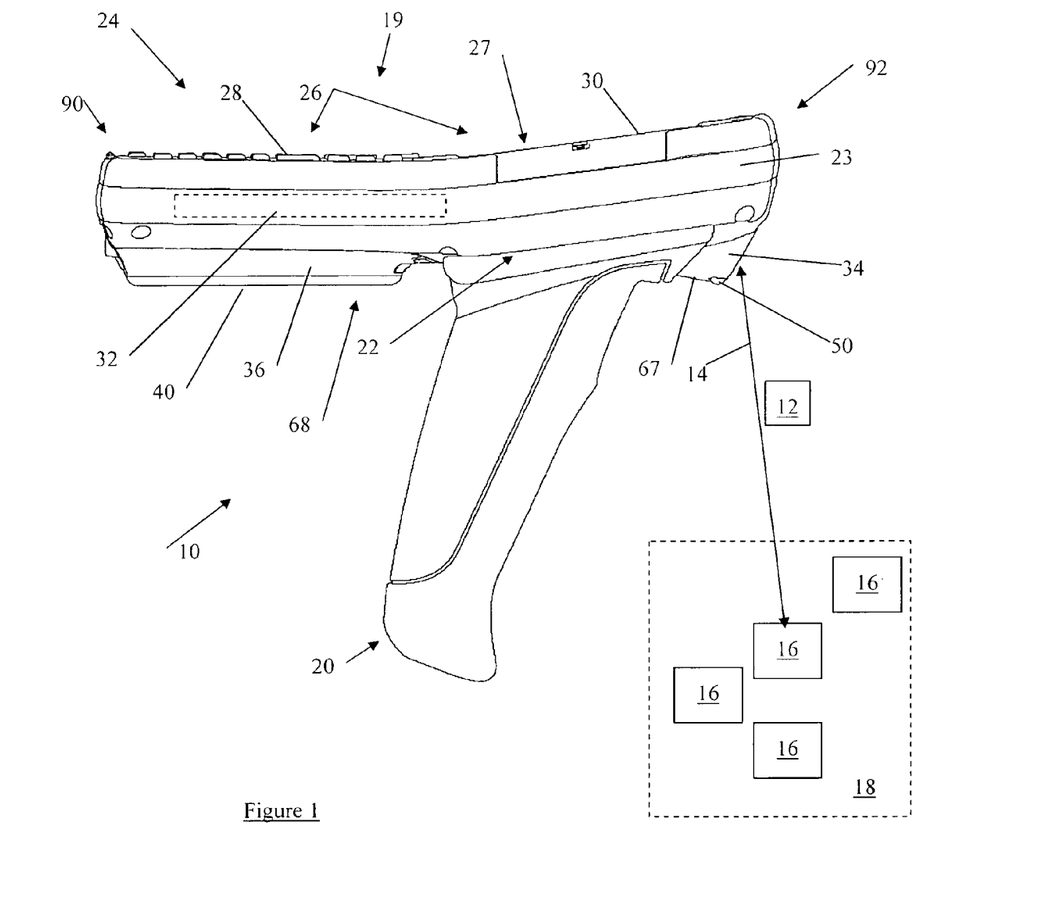
FIG. 1 is a side view of components of a portable terminal for interaction with a logistics environment.

Referring to FIG. 1, shown is a portable terminal 10 for providing imaging and/or scanning features (and/or functions) in data capture/communications 12 and asset tracking/ management, for example in wireless communication 14 with tracking (e.g. information) objects 16 (e.g. barcode labels and/or RFID tags) present in one or more logistics environments 18 (e.g. industrial, retail, supply chain). It is recognised that the tracking objects 16 can be attached to products that are being transported from one location to another in the logistics environment 18. Examples of these environments 18 can include such as but not limited to: front store retail and/or warehousing for mobile stock checking, price checking, and merchandising; and utilities for meter reading, surveying, parking enforcement, and asset tracking.

The portable terminal 10 can have an optional handle 20, connected via a release securable connection 22, to an enclosure 23 of a handheld computer 24. It is recognised that in the description, the terms "housing" and "enclosure" can be used interchangeably. The enclosure has a proximal end 90, a distal end 92, and a pair of sides 94 (see FIG. 2).

The computer 24 has a number of components 19 including a user interface 26 located on a front/top surface 27 of terminal 10, including a keyboard 28 and a display 30 (e.g. touch screen), one or more onboard processors 32 (e.g. shown by ghosted lines as inside of the enclosure 23), and a scanner/radio communications module 34 (e.g. laser, WLAN with VoIP and Bluetooth, imager, RFID scanner, etc. inside of the enclosure 23), for example located on a bottom surface 68 of the terminal 10, for facilitating the wireless communication 14. The communications module 34 can be located inside of a secondary contoured housing 67 attached or otherwise integral to the bottom surface 68 of the enclosure 23. The portable terminal 10 also has an onboard power source 36 located adjacent to the back/bottom surface 68 of the terminal 10 for helping to satisfy power requirements of the onboard processor(s) 32, the user interface 26, and optionally the communication module 34. The power source 36 (e.g. battery) is contained within the enclosure 23 by a cover 40 that is coupled to the enclosure 23 on the back surface 68, as either removable or as an integral part of the enclosure 23, as further described below.

In any event, it is recognised that the terminal 10 of FIG. 1 has a contoured (e.g. curved) profile of at least portions of the bottom surface 68, as further described below. Further, it is recognised that the enclosure 23 includes the top surface 27 and the bottom surface 68 connected to one another by the sides 94 and the ends 90, 92.

Figure 2:
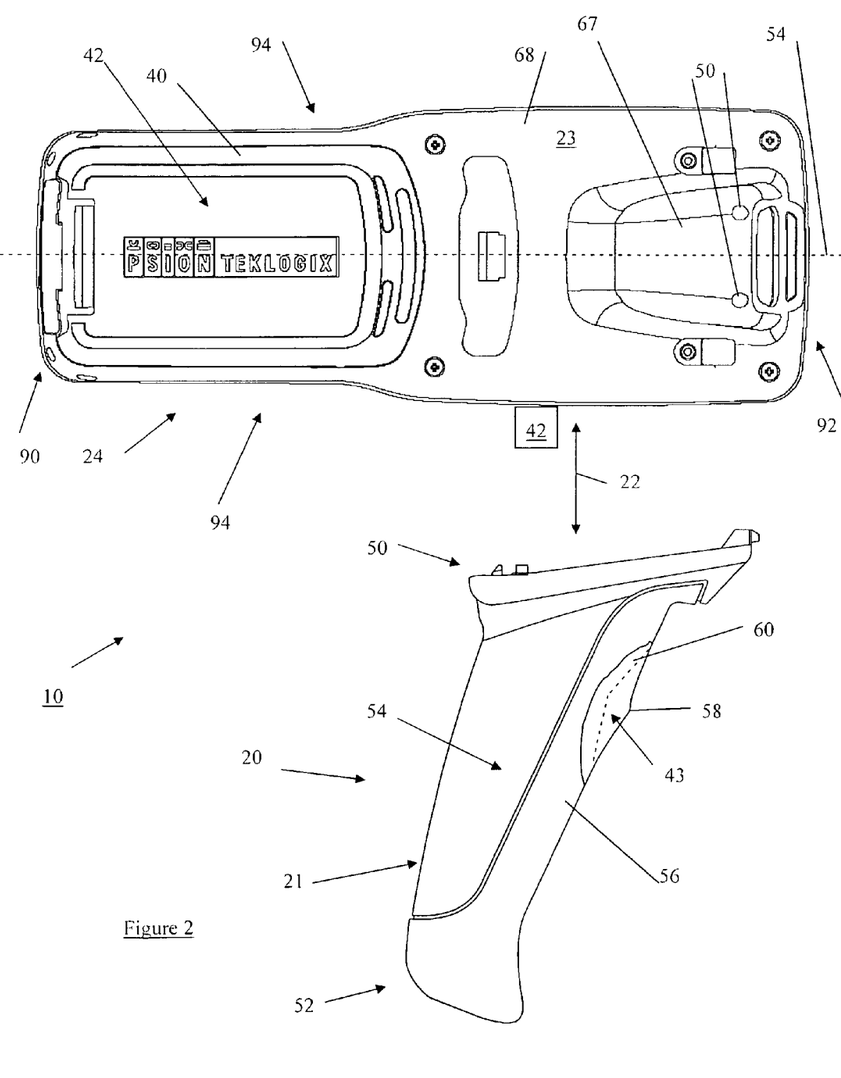
FIG. 2 is a bottom view of the portable terminal of FIG. 1.

Referring to FIG. 2, the handle 20 is shaped for grasping by a hand (not shown) of a user of the portable terminal 10, a body 21 of the handle 20 having a proximal end 50 for coupling to the enclosure 23 of the computer 24, a distal end 52, and a grip portion 54 between the ends 50,52 for grasping by the hand of the user. The grip portion 54 can optionally have an overmould portion 56, preferably made of a resiliently flexible material (e.g. rubber or other suitable polymers), for enhancing the grip of the user's hand on the body 21 of the handle 20. The overmould portion 56 can be referred to as an additional layer formed around the first part (e.g. body 21) that can be a previously moulded part that is reinserted into a secondary mould for forming the additional layer on the previously moulded part. The proximal end 50 can be attached to the grip portion 54 of the body 21 via a plurality of fasteners 70 (e.g. screws), see FIG. 3, which can be configured to releasably secure the proximal end 50 to the grip portion 54, as desired.

The handle 20 also has an actuator assembly 43 (shown in dotted lines underneath the overmould portion 56). The actuator assembly 43 can have a raised portion 58, for facilitating user identification of the actuator assembly 43 underneath the overmould 56. Alternatively, or in addition, the overmould 56 can have an indicator section 60 for indicating to the user the location of the actuator assembly 43 on the grip portion 54 underneath the overmould 56. The indicator section 60, can have a material texture, colour, and/or shading different from other material of the overmould 56. The handle 20 is coupled to the computer 24 via the connection 22, which can include both a mechanical coupling for retaining the handle 20 as physically attached to the enclosure 23 (e.g. frame) and a control coupling for facilitating communication (e.g. instruction/control signals 42) between the actuator assembly 43 (e.g. trigger) of the handle 20 and one or more components 19 of the computer 24.

Figure 3:
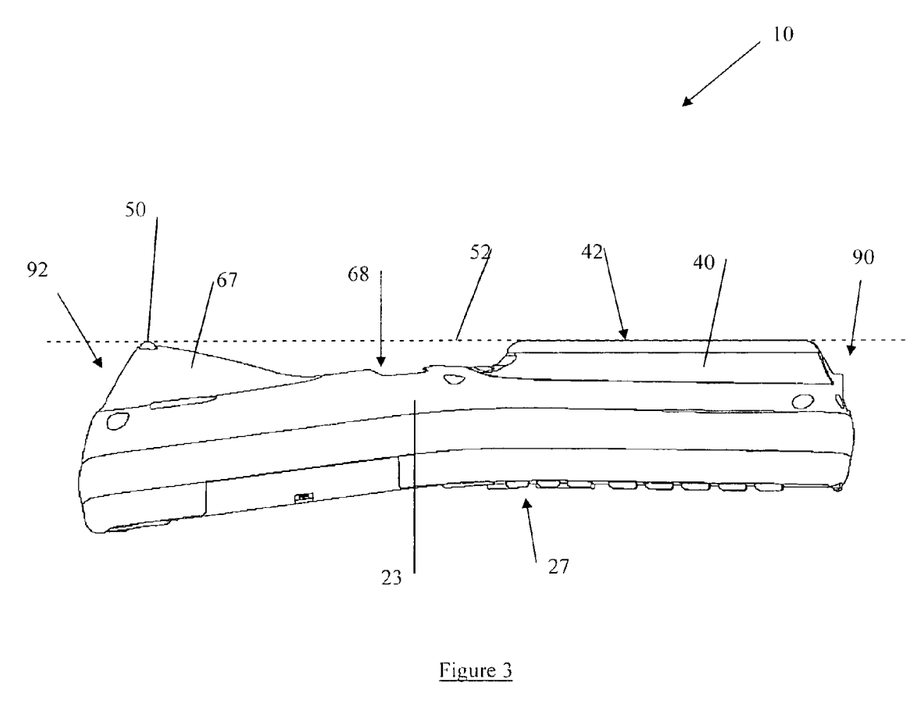
FIG. 3 is a side view of the terminal of FIG. 1.

Referring to FIG. 3, shown is one or more projections 50 extending from the bottom surface 68 of the housing of the terminal 10, at the distal end 92. The projections 50 extend between the bottom surface 68 of the housing 23 to a plane 52 defined by a bottom surface 42 of the cover 40 located at the proximal end 90 of the terminal 10. Further, referring to FIG. 2, the one or more projections 50 are located on both sides of a centerline 54 of the enclosure 23, which extends between the proximal end 90 and the distal end 92. The one or more projections 50 and the bottom surface 42 of the cover 40 provide for a plurality of contact locations 56 (e.g. regions and/or points) on an adjacent work surface 58 (see FIG. 4), such that the contact locations 56 are all located on the plane 52 and are positioned at both the proximal 90 and distal 92 ends of the terminal 10. The distribution of the contact locations 56 at both ends 90,92 and towards both sides 94 of the terminal 10 facilitate the stability of the terminal 10, when positioned on the work surface 58, in order to inhibit side 94 to side 94 and/or end 90 to end 92 motion (e.g. rocking) of the enclosure 23 during operation (e.g. touching) of the user interface 26 by the user of the terminal 10.

Figure 5:
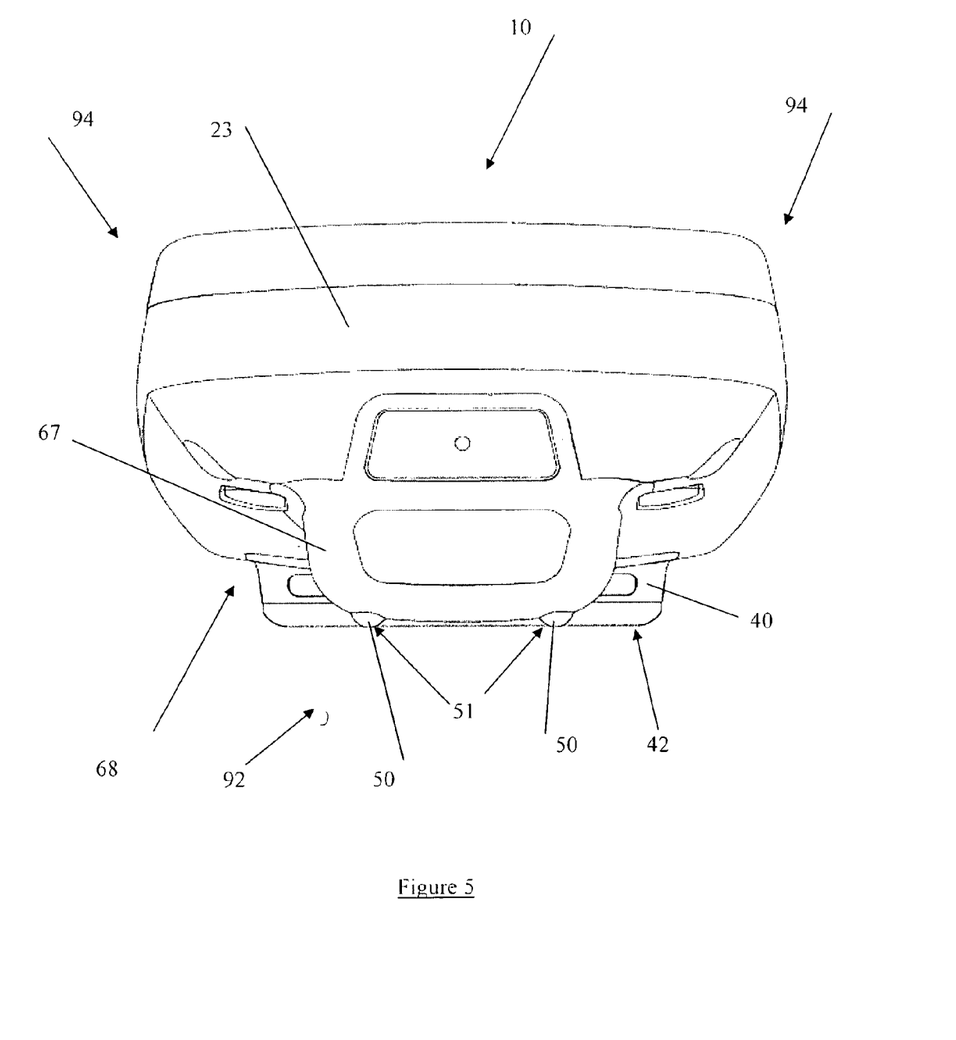
FIG. 5 is a distal side view of the terminal of FIG. 3.

Referring to FIG. 5, shown is the embodiment of the projections 50 as at least a first projection 50 located on one side 94 of the centerline 54 (see FIG. 2) and at least a second projection 50 located on the other side 94 of the centerline 54. The projections 50 are positioned on the secondary housing 67 of the enclosure 23, such that a peripheral surface 51 (e.g. planar, arcuate, etc.) of the projections 50 lies on the plane 52 (see FIG. 3) defined by the surface 42 of the cover 40. It is recognised that the secondary housing 67 of the enclosure 23 can also be considered as integral with the bottom surface 68 of the enclosure 23, as desired.

Figure 6:
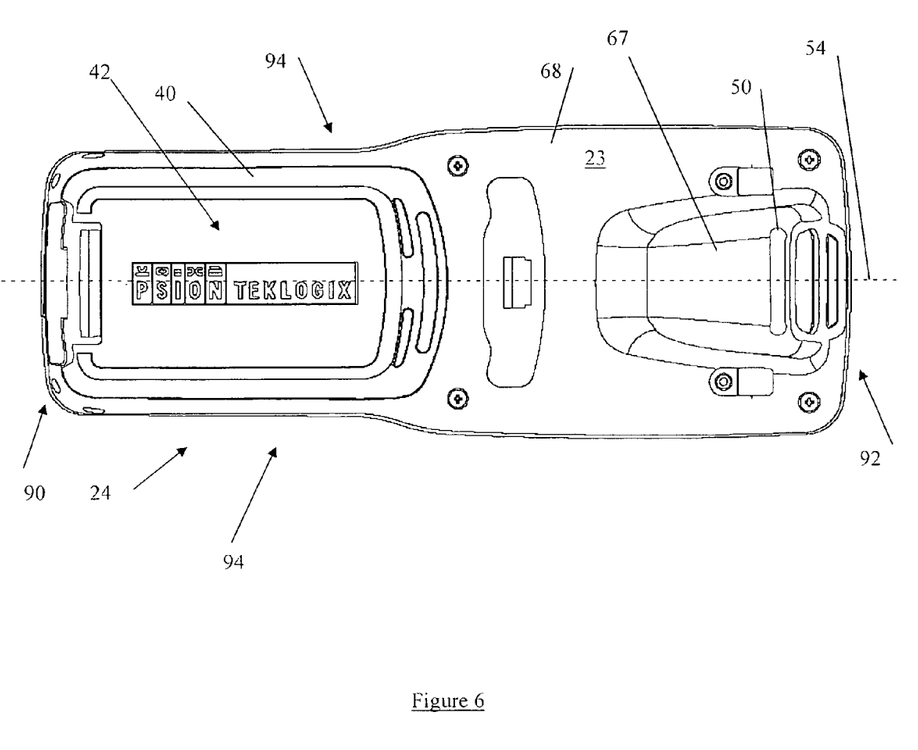
FIG. 6 is an alternative embodiment of the terminal of FIG. 2.
Figure 7:
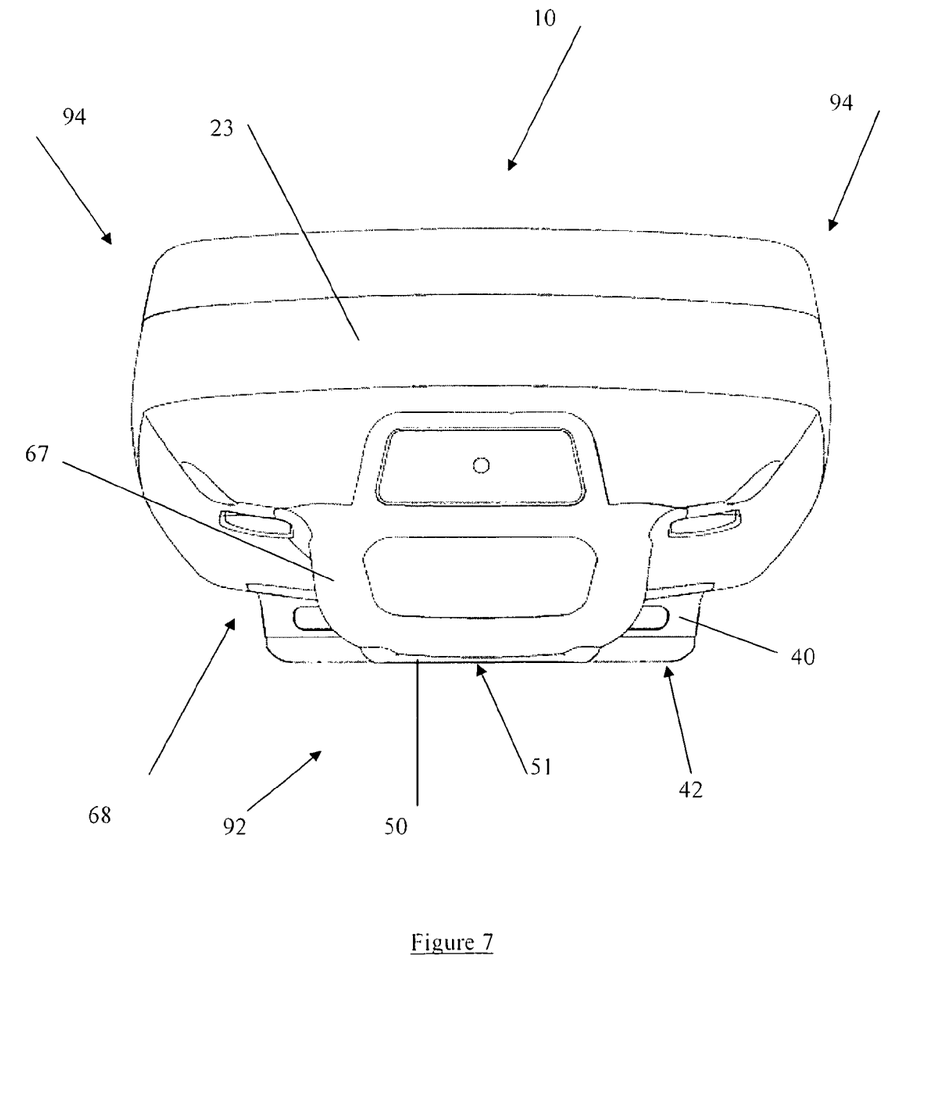
FIG. 7 a distal end view of the terminal of FIG. 6.

Referring to FIGS. 6 and 7, shown is an alternative embodiment of the projections 50 as an elongate projection 50 that extends from the centerline 54 towards both sides 94 of the enclosure 23. The elongate projection 50 is positioned on the secondary housing 67 of the enclosure 23, such that the peripheral surface 51 (e.g. planar) of the elongate projection 50 lies on the plane 52 (see FIG. 3) defined by the bottom surface 42 of the cover 40.

Referring again to FIGS. 2 and 5, one embodiment is shown of the bottom surface 42 of the cover 40, of the enclosure 23. For example, at least a portion of the bottom surface 42 is of a planar shape and defines the plane 52, such that the planar portion of the bottom surface 42 extends towards both sides 94 of the terminal 10 (on either side of the center line 54) and extends in a direction towards both the proximal 90 and distal 92 ends of the terminal.

Figure 8:
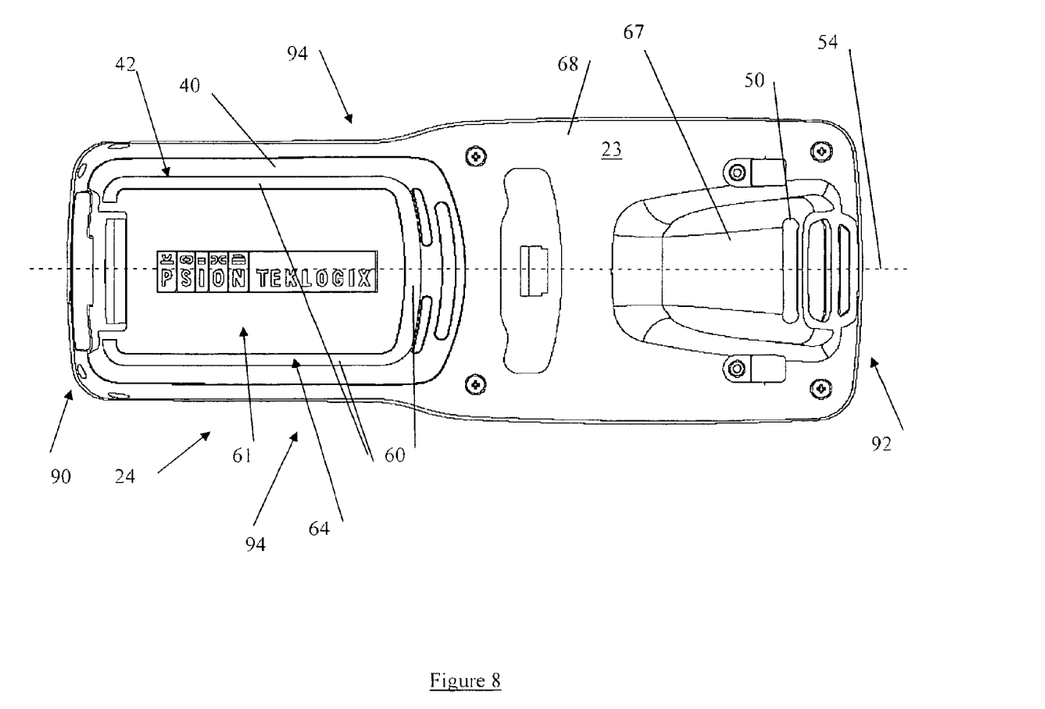
FIG. 8 is an alternative embodiment of the cover of the terminal of FIG. 2.
Figure 9:
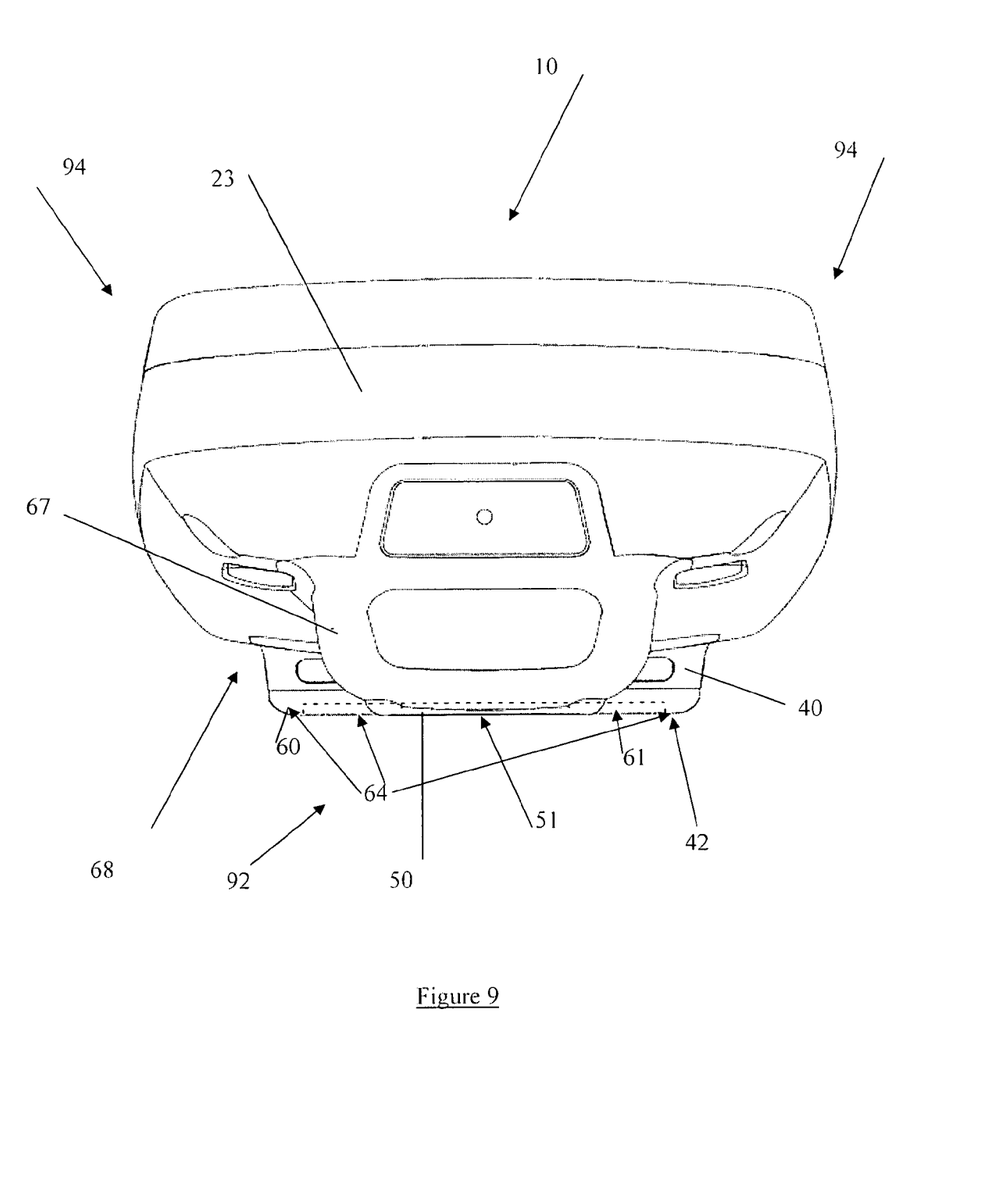
FIG. 9 shows a distal end view of the terminal of FIG. 8.

Referring to FIGS. 8 and 9, shown is an alternative embodiment of the bottom surface 42 of the cover 40 of the enclosure 23. The surface 42 has a depressed region 61 (e.g. defining an arcuate, concave profile) that has a raised rim 60 around at least a portion (e.g. the rim 60 is continuous or is provided as a series of discontinuous sections) of a periphery 62 of the cover 40, such that the rim 60 has a peripheral surface 64 (e.g.

planar, arcuate, etc.) that defines the plane 52 (see FIG. 3) that is in common with the peripheral surface 51 of the portion(s) 50.

Figure 4:
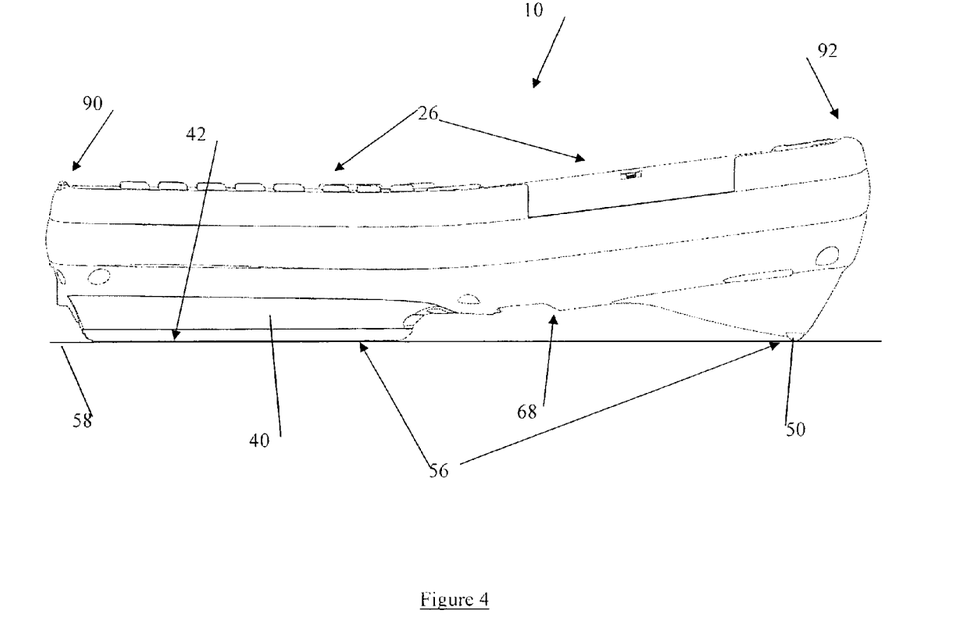
FIG. 4 shows an example placement of the terminal of FIG. 1 omn an adjacent work surface.

In any event, in view of the above, it is recognised that the bottom surface 42 of the cover 40 and the peripheral surface 51 of the projection(s) 50 extend to a common plane 52 (see FIG. 3), in order to help facilitate the stability of the terminal 10 when positioned on any adjacent work surface 58 (see FIG. 4). It is also recognised that the plane is defined by the bottom surface 42 of the cover 40, such that the projection(s) 50 extend between the bottom surface 68 of the enclosure 23 and the plane 52.

Figure 10:
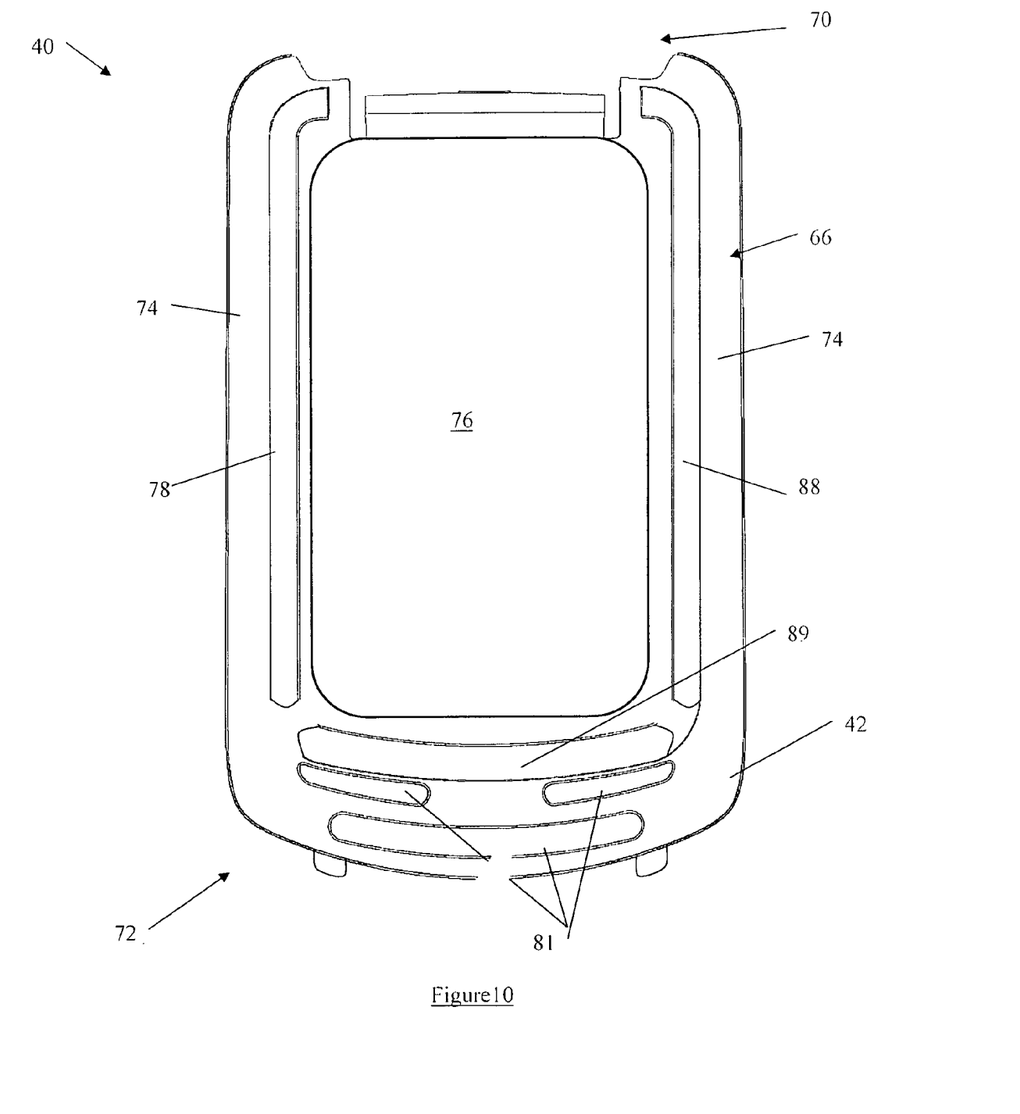
FIG. 10 shows a plurality of grip portions of the terminal of FIG. 1.
Figure 11:
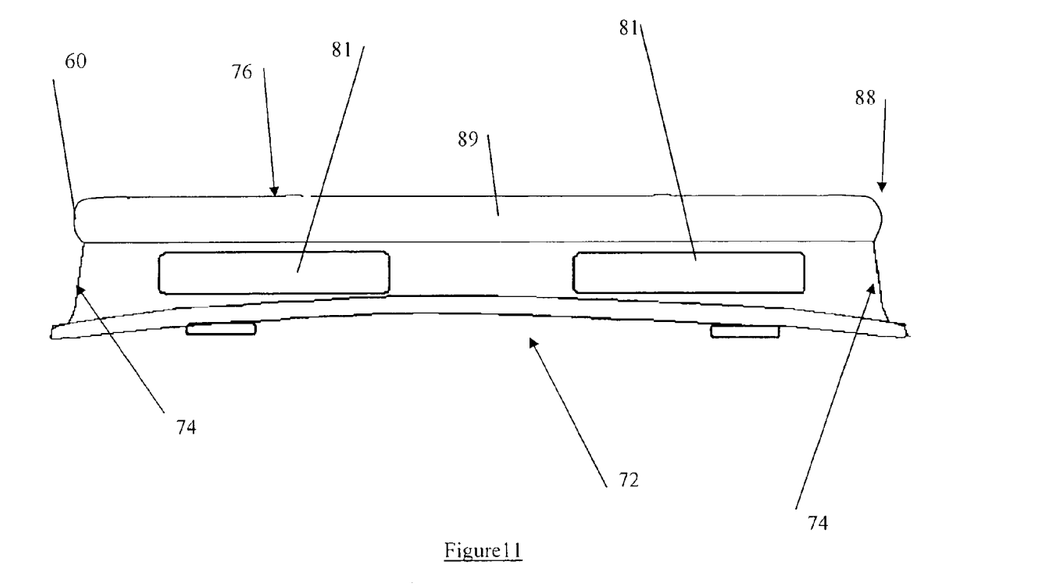
FIG. 11 shows a distal end view of the terminal of FIG. 10.
Figure 12:
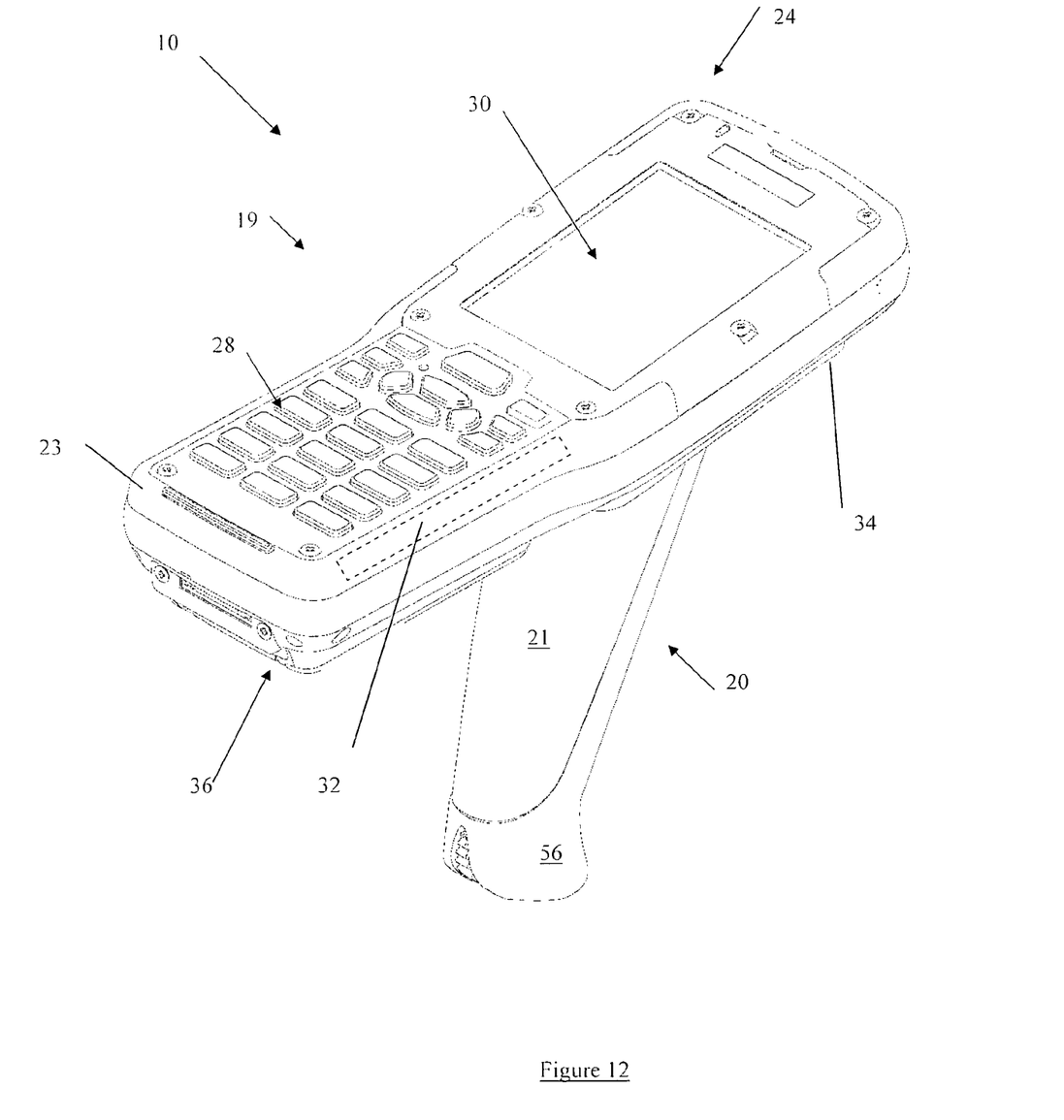
FIG. 12 is a top rear perspective view of the portable terminal of FIG. 1.
Figure 13:
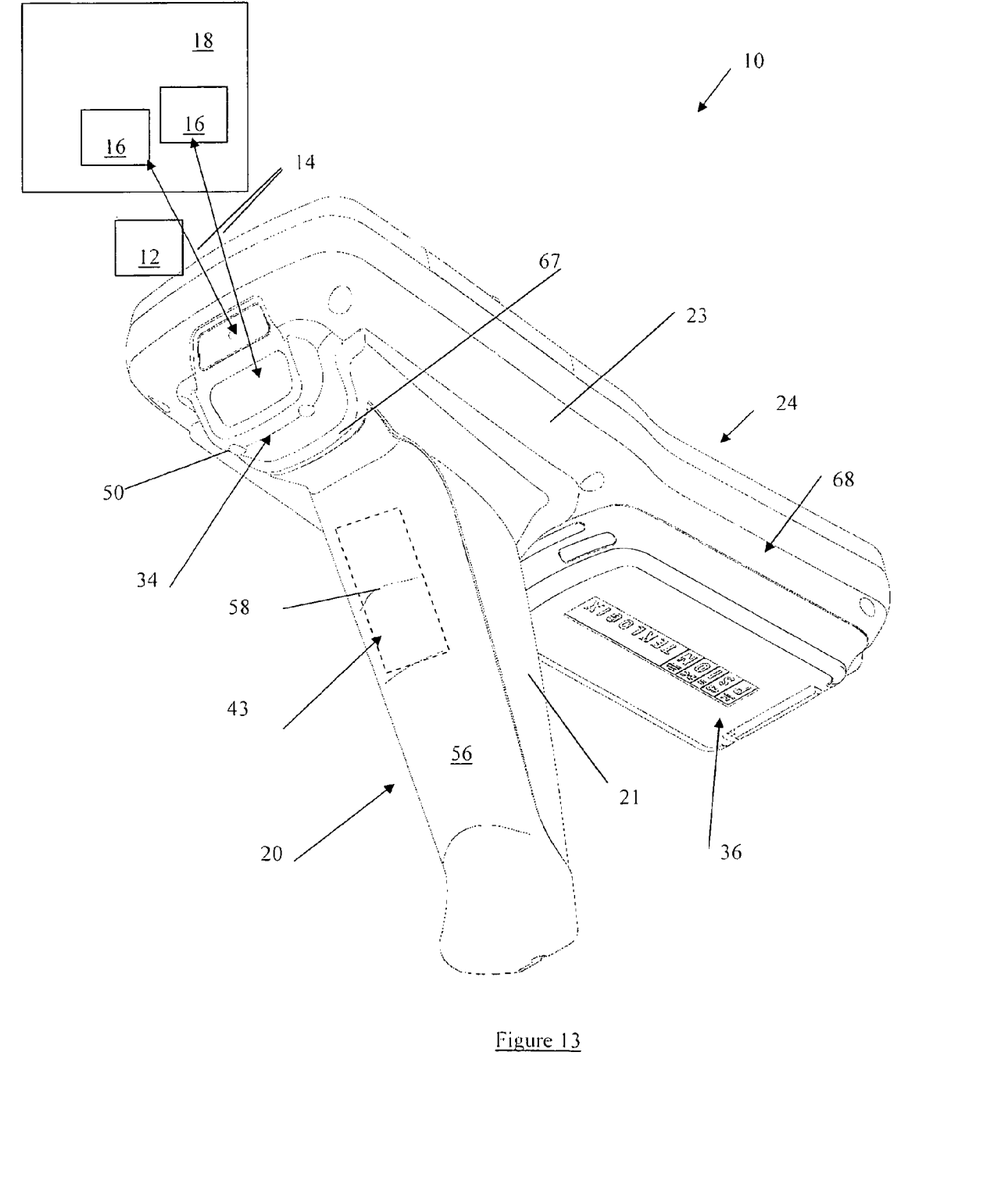
FIG. 13 is a bottom front perspective view of the portable terminal of FIG. 1.

Referring to FIGS. 10 and 11, shown is a body 66 of the cover 40 having a proximal end/portion 70, a distal end wall 72, a pair of side wall portions 74 extending between the proximal 70 and distal 72 ends, and the cover surface 76 extending between the ends 70, 72 and the side wall portions 74, to define an interior 78 for the battery 36 (see FIG. 1). The interior 78, for example in cooperation with the enclosure 23, helps to define a compartment for the power source 36. Located on the external surface of one or more (on both is shown) of the side wall portions 74 can be a side grip portion 88. Located on the distal end wall can be a first end grip portion 89 that may or may not be integral (e.g. continuous) with the side grip portion(s) 88. Further, the distal end wall 72 can also have one or more second grip portions 81, positioned on the body 66 wall as further described below. Accordingly, the cover 40 can have one or more grip portions 88,89,81 attached on the exterior surface of the cover housing 66, and/or the enclosure 23, such that the grip portions 88,89,81 are composed of a resilient material for facilitating grasping by the at least one finger (of the user) of the cover housing 66 an/or to provide enhanced grip between the cover 40 and the adjacent work surface 58 (see FIG. 4). For example, the rim 60 (see FIGS. 8 and 9) can be comprised as the grip portion(s) 88, 89.

The grip portions 88,89,81 are preferably made of a resilient material (e.g. rubber or other elastomeric material), a textured rigid material, a textured resilient material, or a combination thereof. The grip portions 88,89,81 are configured for enhancing a grip between the user's fingers and the cover 40, and/or for enhancing the grip between the cover 40 and the adjacent work surface 58. The grip portions 88,89,81 can be overmoulded to the body 66 of the cover 40, and/or adhered to the body 66 using adhesive or some other bonding agent that is compatible with the material of the body 66 and the material of the grip portions 88,89,81. Further, it is recognised that the grip portions 88,89,81 can be integral to the material of the body 66 and therefore presented as textured regions of the body 66 material. In any event, it is recognised that the grip portion(s) 88,89,81 can be composed of different material and/or texture than that of the remainder of the material and/or texture composition of the body 66. It is also recognised that the grip portions 88,89,81 can be positioned over a portion of the surface of the side wall 74 and distal end wall 72 as shown, and/or can be positioned over the entire surface of the side wall 74 and/or distal end wall 72. Further, as shown the grip portion 48 can be attached including the side wall(s) 74, the cover surface 76, and the end wall 72.

One above-discussed embodiment of the grip portions 88,89,81 can be expressed as an overmould portion attached (e.g. adhered or otherwise bonded to the cover housing 66 and/or the enclosure 23), preferably made of a resiliently flexible material (e.g. rubber or other suitable polymers). The overmould can be referred to as an additional layer formed around the first part (e.g. body 66) that can be a previously moulded part that is reinserted into a secondary mould for forming the additional layer on the previously moulded part. For example, after injection and forming of the first moulded part, i.e. the body 66, the component is rotated on a core from the one mould cavity to another. The second mould cavity is different from the first mould cavity in that the detail for the second moulded part is included and used to add the overmoulded grip portion(s) 88,89,81.

The material (e.g. rubberized polymer) for the second moulded part (i.e. the overmould grip portion 88,89,81) is then injected into the second mould cavity detail before the completed part (i.e. body 66 and overmould grip portions 88,89,81) is ejected from the second mould. It is recognised that one example embodiment of the cover 40 is where the body 66 is made of a hard/rigid plastic material (e.g. thermoplastic polymer) while the overmould grip portion(s) 88,89, 81 is made of a softer, resilient material (e.g. thermoplastic elastomer (TPE) materials) that is adhered to the material/substrate (e.g. polypropene (PP), acrylonitrile-butadiene-styrene (ABS), polycarbonate (PC), Nylon etc.) of the body 66, thus facilitating a combined comfortable, non-slip, and abrasion-resistant grip portion(s) 88,89,81 of the cover 40. It is recognised that other fabrication methods can be used to assemble the overmould to the body 66 of the cover 40, as known to a person skilled in the art.

It is recognised that the grip portion(s) 88,89,81 can have a material composition, texture, colour, and/or shading different from the material of the body 66.

We claim:

1. A portable computing device including a housing having a top surface and a bottom surface connected to one another by a pair of sides, a proximal end and a distal end, the top surface including a user interface for operation by a user, the device comprising:

a planar surface located on the bottom surface at the proximal end, the planar surface extending to either side of a centerline of the housing and in a direction towards the distal end, the planar surface defining a plane, the centerline extending in a direction between the proximal end and the distal end;

a first protrusion located on the bottom surface at the distal end, the first protrusion extending between the bottom surface and the plane, such that the first protrusion has a peripheral surface lying on the plane on one side of the centerline;

a second protrusion located on the bottom surface at the distal end, the second protrusion extending between the bottom surface and the plane, such that the second protrusion has a peripheral surface lying on the plane on the other side of the centerline;

wherein the first protrusion, the second protrusion and the planar surface provide stability of the device when placed on a surface adjacent to the bottom surface, the stability facilitating operation of the user interface by the user, and wherein the planar surface is provided as a raised rim around a periphery of at least a portion of a bottom surface of a power source cover, such that the rim has a peripheral surface that defines the plane that is in common with the peripheral surface of the first protrusion and the peripheral surface of the second protrusion.

2. The device of claim 1, wherein the peripheral surfaces of the first protrusion and the second protrusion are arcuate.

3. The device of claim 1, wherein the planar surface is provided as a bottom surface of a power source cover to define the plane, such that the planar bottom surface of the power source cover extends towards both sides on either side of the center line and extends in a direction towards both the proximal and distal ends, the power source cover coupled to the bottom surface of the housing.

4. The device of claim 3, wherein the user interface includes a keypad located at one of the ends and a display located at the other of the ends.

5. The device of claim 3, wherein the keypad is located at the proximal end.

6. The device of claim 1, wherein the rim selected from the group comprising: continuous; and a plurality of discontinuous sections.

7. The device of claim 1, wherein the peripheral surface of the rim is arcuate.

8. A portable computing device including a housing having a top surface and a bottom surface connected to one another by a pair of sides, a proximal end and a distal end, the top surface including a user interface for operation by a user, the device comprising:

a planar surface located on the bottom surface at the proximal end, the planar surface extending to either side of a centerline of the housing and in a direction towards the distal end, the planar surface defining a plane, the centerline extending in a direction between the proximal end and the distal end;

a first protrusion located on the bottom surface at the distal end, the first protrusion extending between the bottom surface and the plane, such that the first protrusion has a peripheral surface lying on the plane on one side of the centerline;

a second protrusion located on the bottom surface at the distal end, the second protrusion extending between the bottom surface and the plane, such that the second protrusion has a peripheral surface lying on the plane on the other side of the centerline;

a secondary contoured housing coupled to the bottom surface of the housing at the distal end;

wherein the first protrusion, the second protrusion and the planar surface provide stability of the device when placed on a surface adjacent to the bottom surface, the stability facilitating operation of the user interface by the user and the planar surface is provided as a bottom surface of a power source cover to define the plane, such that the planar bottom surface of the power source cover extends towards both sides on either side of the center line and extends in a direction towards both the proximal and distal ends, the power source cover coupled to the bottom surface of the housing.

9. The device of claim 8, wherein the first and second protrusions are located on the secondary housing.

10. The device of claim 9, wherein the secondary housing is configured to contain an antenna.

11. The device of claim 10, wherein the bottom surface of the power source cover includes a grip portion made of a resilient material for enhancing the grip between the cover and the adjacent work surface.

* * * * *

UNITED STATES PATENT AND TRADEMARK OFFICE
CERTIFICATE OF CORRECTION

PATENT NO. : 7,787,239 B2  
APPLICATION NO. : 12/284416  
DATED : August 31, 2010  
INVENTOR(S) : Mangaroo et al.

Page 1 of 1

It is certified that error appears in the above-identified patent and that said Letters Patent is hereby corrected as shown below:

In the Specifications:

In Column 2, Line 44, delete "omn" and insert -- on --, therefor.

In Column 2, Line 48, delete "a" and insert -- is a --, therefor.

In Column 4, Line 48, delete "23.The" and insert -- 23. The --, therefor.

Signed and Sealed this  
Twenty-third Day of April, 2013

Teresa Stanek Rea  
*Acting Director of the United States Patent and Trademark Office*